United States Patent
Rodriguez-Serrano et al.

(10) Patent No.: US 9,100,572 B2
(45) Date of Patent: Aug. 4, 2015

(54) METHODS AND SYSTEMS FOR CONFIDENCE-BASED IMAGE PROCESSING

(71) Applicant: XEROX CORPORATION, Norwalk, CT (US)

(72) Inventors: Jose A. Rodriguez-Serrano, Grenoble (FR); Peter Paul, Webster, NY (US); Florent Perronnin, Doméne (FR)

(73) Assignee: XEROX CORPORATION, Norwalk, CT (US)

( * ) Notice: Subject to any disclaimer, the term of this patent is extended or adjusted under 35 U.S.C. 154(b) by 133 days.

(21) Appl. No.: 13/902,183

(22) Filed: May 24, 2013

(65) Prior Publication Data

US 2014/0347511 A1    Nov. 27, 2014

(51) Int. Cl.
*H04N 5/228* (2006.01)
*H04N 7/18* (2006.01)
*H04N 5/232* (2006.01)
*G06K 9/00* (2006.01)
*H04N 5/235* (2006.01)

(52) U.S. Cl.
CPC ........ *H04N 5/23245* (2013.01); *G06K 9/00825* (2013.01); *H04N 5/23222* (2013.01); *H04N 5/2354* (2013.01)

(58) Field of Classification Search
CPC .................. H04N 5/23222; G06K 9/00825
USPC ............ 348/208.14, 345, 370, 371, 122, 155, 348/149, 148, 169
See application file for complete search history.

(56) References Cited

U.S. PATENT DOCUMENTS

| 6,507,366 | B1 * | 1/2003  | Lee .......................... | 348/352 |
| 6,970,103 | B2 * | 11/2005 | Bortolotto ................ | 340/937 |
| 7,256,817 | B2   | 8/2007  | Yata |  |
| 7,825,829 | B2 * | 11/2010 | Madsen .................... | 340/937 |
| 2003/0235269 | A1 * | 12/2003 | Rosner et al. .............. | 378/69 |
| 2012/0314123 | A1 * | 12/2012 | Lee et al. .................. | 348/362 |

FOREIGN PATENT DOCUMENTS

WO        0101685 A1    1/2001

\* cited by examiner

*Primary Examiner* — Ahmed A Berhan
(74) *Attorney, Agent, or Firm* — MH2 Technology Law Group LLP

(57) ABSTRACT

A system and method for triggering image re-capture in image processing by receiving a first image captured using a first mode, performing a computer vision task on the first image to produce a first result, generating a confidence score of the first result using a machine learning technique, triggering an image re-capture using a second mode in response to the confidence score of the first result, and performing the computer vision task on a result of the image recapture using the second mode.

20 Claims, 7 Drawing Sheets

METHODS AND SYSTEMS FOR CONFIDENCE-BASED IMAGE PROCESSING

TECHNICAL FIELD

The present disclosure relates generally to methods, systems, and computer-readable media for triggering image re-capture based on confidence scores in image processing.

BACKGROUND

Computer vision is the science of electronically perceiving and understanding images and includes a wide variety of practical applications. For example, computer vision can be used in navigation, visual surveillance, human-computer interaction, etc.

In computer vision, the quality of captured images is a critical factor in the ability of a computing device to process the captured images to detect, localize, recognize, and/or identify objects. Accordingly, many computer vision systems are often forced to account for worst-case image conditions by using high-cost equipment and/or high-cost methods to obtain high quality images. However, such equipment and methods may not be necessary for every imaging condition.

As an example, a computer vision system set up to perform automatic license plate recognition (ALPR) may require flash illumination to obtain images that can be processed during periods of low ambient illumination. However, utilizing flash illumination may lead to additional expenses as it may require lamp replacement after a certain number of flashes. Further, the same system may not require flash illumination during periods of high ambient illumination.

Therefore, computer vision techniques can be improved by methods and systems that optimize the use of high-cost computer vision equipment and methods.

SUMMARY OF THE INVENTION

The present disclosure relates generally to methods, systems, and computer readable media for providing these and other improvements to computer vision technologies.

In some embodiments, a computing device can receive a first image captured by a camera using a first mode. The computing device can process the first image to, for example, detect, localize, recognize, or identify an object in the first image, and the computing device can produce a confidence score of a result of the processing. If the confidence score exceeds a threshold, the computing device can use the results of the processing. However, if the confidence score does not exceed the threshold, the computing device can trigger a capture of a second image by the camera using a second mode. The computing device can process the second image and use the results of the second processing.

In additional embodiments, a computing device can receive a first image from a first camera. The computing device can process the first image to, for example, detect, localize, recognize, or identify an object in the first image, and the computing device can produce a confidence score of a result of the processing. If the confidence score exceeds a threshold, the computing device can use the results of the processing. However, if the confidence score does not exceed the threshold, the computing device can trigger a capture of a second image by a second camera. The computing device can process the second image and use the results of the second processing.

In other embodiments, a computing device can receive a first image captured by a camera using a first mode. The computing device can process the first image to, for example, detect, localize, recognize, or identify an object in the first image, and the computing device can produce a confidence score of a result of the processing. If the confidence score exceeds a threshold, the computing device can use the results of the processing. However, if the confidence score does not exceed the threshold, the computing device can trigger a capture of a subsequent image by the camera using a different mode. The computing device can process the subsequent image and produce a confidence score of the subsequent processing. If the confidence score exceeds the threshold, the computing device can use the results of the subsequent processing. However, if the confidence score does not exceed the threshold, the computing device can continue to trigger capture of subsequent images using subsequent modes until either all modes are used or a confidence score exceeds the threshold.

In further embodiments, a computing device can receive an image captured by a camera using a first mode. The computing device can process the first image to, for example, detect, localize, recognize, or identify an object in the first image, and the computing device can produce a confidence score of a result of the processing. If the confidence score exceeds a threshold, the computing device can use the results of the processing and capture a subsequent image using the first mode. However, if the confidence score does not exceed the threshold, the computing device can trigger a capture of a subsequent image by the camera using a second mode and process the subsequent image. Further, the computing device can continue to use the second mode on subsequent images for a select number of iterations or for a select amount of time. If the select number of iterations of using the second mode has occurred or the select amount of time has passed the computing device can process a subsequent image using the first mode and repeat the above steps.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
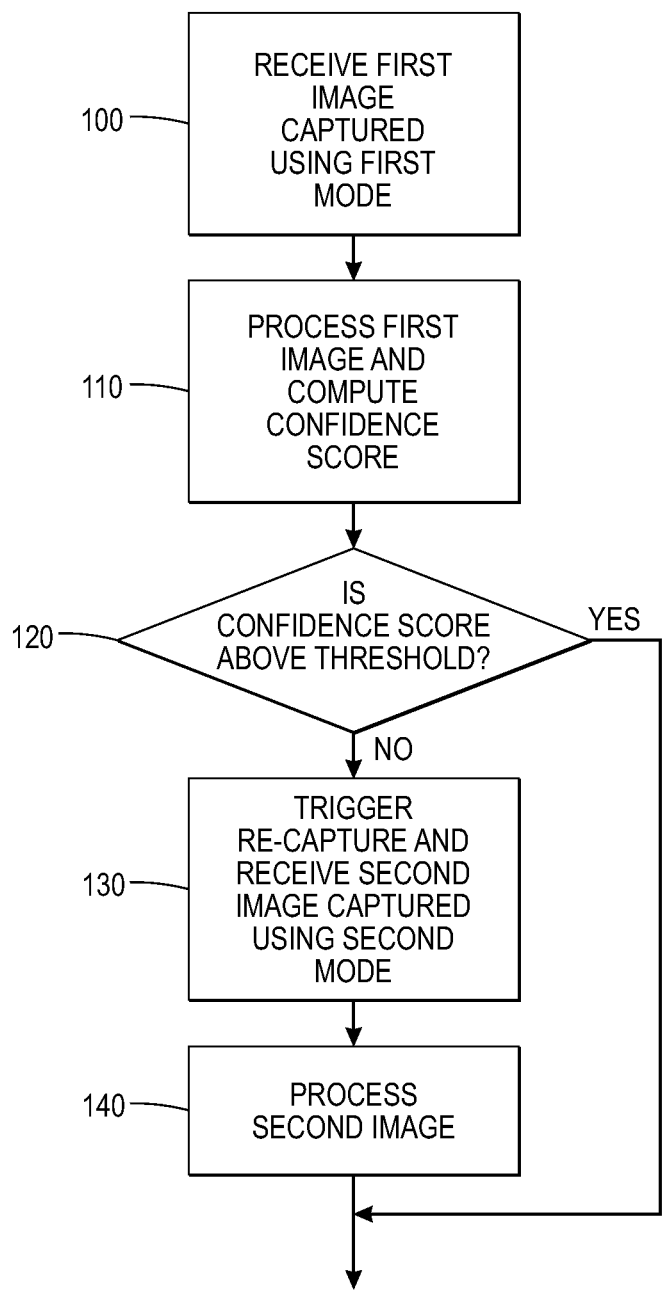
FIG. 1 is a flow diagram illustrating an exemplary method for triggering image re-capture based on confidence scores, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method for triggering image re-capture based on confidence scores, consistent with certain disclosed embodiments. The process can begin at 100 when a computing device receives a first image from a camera, and the first image was captured using a first mode. As used herein, an image can, in embodiments, represent a single still image, while, in further embodiments, the image can represent a sequence of images, such as a video clip or a sequence of still images.

Additionally, as used herein, a mode (e.g. first mode, second mode, alternative mode, etc.) refers to a way or manner of capturing images using a camera and/or operating a camera. For example, a camera may operate in a mode where specific equipment is used, where a specific method of operating the camera is used, where specific settings of the camera are selected, where the camera is positioned in a certain manner, etc.

In embodiments, the first mode can represent a simple mode of capturing an image. For example, use of the first mode can create an image taken without the use of additional equipment (e.g. an illumination source) or an image taken using lower resolution settings of the camera. In additional embodiments, the first mode can represent capturing an image with a wide field-of-view.

In 110, the computing device can process the first image. For example, the computing device can perform computer vision tasks that include, but are not limited to object detection (e.g. face detection and pedestrian detection), object localization, object recognition (e.g. ALPR), and object identification (e.g. specific face identification, specific vehicle identification, and fingerprint identification).

Additionally, the computing device can compute a confidence score of a result of possessing the first image by leveraging machine learning techniques. Examples of machine learning techniques include, but are not limited to support vector machines (SVM), Adaptive Boosting (AdaBoost), artificial neural networks, etc.

In some embodiments, the confidence score can be computed based on the distance a particular decision making metric is from a decision boundary. The further the particular decision making metric is from the decision boundary, the more confidence there is that the decision is correct.

As used herein, a higher confidence score corresponds to a higher confidence that the result of possessing an image is correct, and a lower confidence score corresponds to a lower confidence that the result of processing the image is correct.

Additionally, although examples as used herein may refer to confidence scores as percentage values between 0% and 100%, confidence scores can span other ranges of values and are not limited to percentage values. In some embodiments, confidence score values can be converted to percentage values, while, in further embodiments, the confidence score values may not be converted.

In 120, the computing device can compare the confidence score from 110 to a threshold score. If the confidence score is greater than or, in some embodiments, equal to the threshold score, the computing device can use the result of processing the first image for an intended task. For example, if the computing device is configured to perform ALPR, the computing device can store and/or transmit the recognized license plate information from the first image.

However, if in 120 the confidence score is less than or, in some embodiments, equal to the threshold score, the computing device can continue to 130. In 130, the computing device can trigger an image re-capture and receive a second image from the camera, where the second image was captured using a second mode.

In embodiments, the second mode can represent an advanced mode of capturing an image compared to the first mode. For example, use of the second mode can create an image taken with the use of additional equipment (e.g. an illumination source) or an image taken using higher resolution settings of the camera. In additional embodiments, the second mode can represent capturing an image with a narrow and/or zoomed-in field-of-view compared to the first mode, creating, for example, a higher resolution image of the zoomed-in region.

In some embodiments, the second mode can be preset. For example, the second mode can involve using a flash bulb, the second mode can involve using a set resolution that is higher than the resolution for the first mode, or the second mode can involve zooming into a predetermined section of the wide field-of-view from the first mode.

In further embodiments, the second mode can be set based on the results of processing the first image. For example, if an object was detected in the first image but a confidence score for a recognition task performed on that object was low, the computing device can transmit a command to the camera to pan, tilt, and/or zoom to capture as the second image a specific area with higher resolution within the wide field-of-view from the first image.

In 140, the computing device can process the second image. For example, the computing device can perform computer vision tasks that include, but are not limited to, object detection, object localization, object recognition, and object identification. Then the computing device can use the result of processing the second image for the intended task (e.g. ALPR).

While the steps depicted in FIG. 1 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 2:
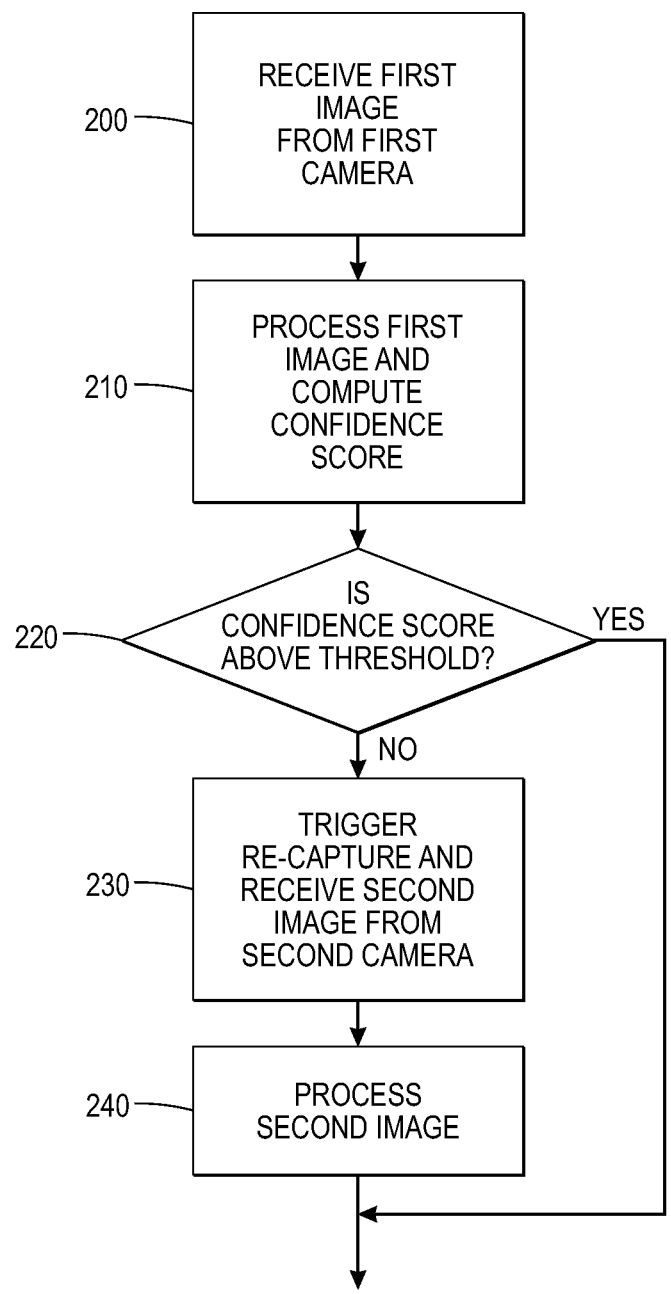
FIG. 2 is a flow diagram illustrating an exemplary method for triggering image re-capture based on confidence scores, consistent with certain disclosed embodiments.

FIG. 2 is a flow diagram illustrating an exemplary method for triggering image re-capture based on confidence scores, consistent with certain disclosed embodiments. The process can begin at 200 when a computing device receives a first image from a first camera, and the first camera is set to capture images using a first mode.

In embodiments, the first mode can represent a simple mode of capturing an image. For example, use of the first mode can create an image taken without the use of additional equipment (e.g. an illumination source) or an image taken using lower resolution settings of the camera. Additionally, in some embodiments, the first camera may be a comparably inexpensive camera (e.g. a low resolution camera) or a camera that does not include additional equipment (e.g. is not connected to an illumination source). In further embodiments, the first mode can represent capturing an image with a wide field-of-view. In other embodiments, the first camera can be positioned as to have a wide field-of-view.

In 210, the computing device can process the first image. For example, the computing device can perform computer vision tasks that include, but are not limited to object detection, object localization, object recognition, and object identification.

Additionally, the computing device can compute a confidence score of a result of processing the first image by leveraging machine learning techniques. For example, the computing device can leverage machine learning techniques that include, but are not limited to SVM, AdaBoost, artificial neural networks, etc.

In 220, the computing device can compare the confidence score from 210 to a threshold score. If the confidence score is greater than or, in some embodiments, equal to the threshold score, the computing device can use the result of processing the first image for an intended task (e.g. ALPR).

However, if in 220 the confidence score is less than or, in some embodiments, equal to the threshold score, the computing device can continue to 230. In 230, the computing device can trigger an image re-capture and receive a second image from a second camera, where the second camera is set to capture images using a second mode.

In embodiments, the second mode can represent an advanced mode of capturing an image compared to the first mode. For example, use of the second mode can create an image taken with the use of additional equipment (e.g. an illumination source) or an image taken using higher resolution settings of the camera. Additionally, in some embodiments, the second camera may be a comparably costly camera compared to the first camera (e.g. a high-definition camera) or a camera that includes additional equipment (e.g. includes a flash bulb). In further embodiments, the second mode can represent capturing an image with a narrow and/or zoomed-in field-of-view compared to the first mode. In other embodiments, the second camera can be position as to have a narrow and/or zoomed-in field-of view compared to the first camera.

In some embodiments, the second mode can be preset. For example, the second mode can involve using a flash bulb, the second mode can involve using a set resolution that is higher than the resolution for the first mode, or the second mode can involve zooming into a predetermined section of the wide field-of-view from the first mode. In other embodiments, the position of the second camera can be set so that the second camera has a different perspective than the first camera. For example, the second camera can be set closer to a particular scene.

In further embodiments, the second mode can be set based on the results of processing the first image. For example, if an object was detected in the first image but a confidence score for a recognition task performed on the object was low, the computing device can transmit a command to the second camera to pan, tilt, and/or zoom to capture as the second image a specific area within the wide field-of-view captured by the first camera.

In 240, the computing device can process the second image. For example, the computing device can perform computer vision tasks that include, but are not limited to object detection, object localization, object recognition, and object identification. Then the computing device can use the result of processing the second image for the intended task (e.g. ALPR).

While the steps depicted in FIG. 2 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 3:
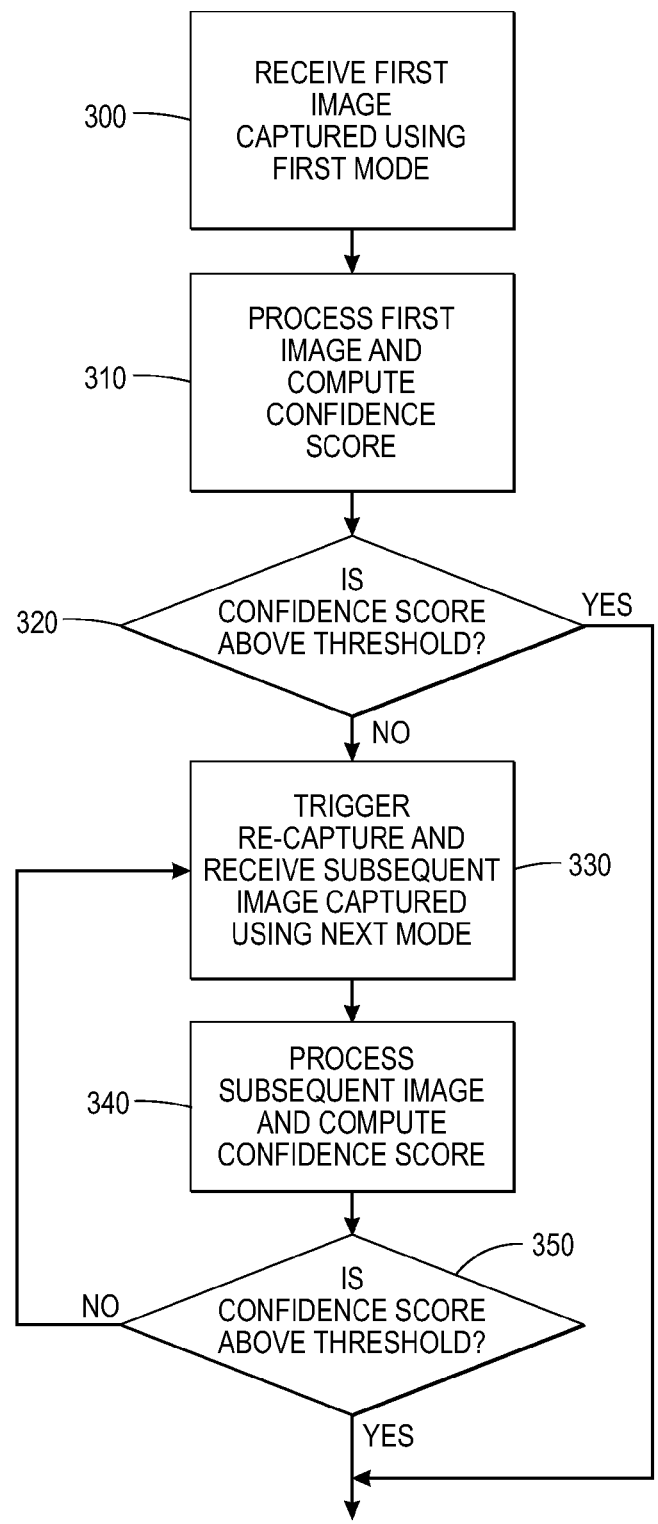
FIG. 3 is a flow diagram illustrating an exemplary method for triggering image re-capture based on confidence scores, consistent with certain disclosed embodiments.

FIG. 3 is a flow diagram illustrating an exemplary method for triggering image re-capture based on confidence scores, consistent with certain disclosed embodiments. The process can begin at 300 when a computing device receives a first image from a camera, and the first image was captured using a first mode.

In embodiments, the first mode can represent a simple mode of capturing an image. For example, use of the first mode can create an image taken without the use of additional equipment (e.g. an illumination source) or an image taken using lower resolution settings of the camera. In additional embodiments, the first mode can represent capturing an image with a wide field-of-view.

In 310, the computing device can process the first image. For example, the computing device can perform computer vision tasks that include, but are not limited to object detection, object localization, object recognition, and object identification.

Additionally, the computing device can compute a confidence score of a result of processing the first image by leveraging machine learning techniques. For example, the computing device can leverage machine learning techniques that include, but are not limited to SVM, AdaBoost, artificial neural networks, etc.

In 320, the computing device can compare the confidence score from 310 to a threshold score. If the confidence score is greater than or, in some embodiments, equal to the threshold score, the computing device can use the result of processing the first image for an intended task (e.g. ALPR).

However, if in 320 the confidence score is less than or, in some embodiments, equal to the threshold score, the computing device can continue to 330. In 330, the computing device can trigger an image re-capture and receive a subsequent image captured using an alternative mode.

In embodiments, the alternative mode can represent an advanced mode of capturing an image compared to the first mode. In other embodiments, the alternative mode can further represent a mode of capturing an image that is different from modes that were used in previous iterations of steps 330-350.

As an example, use of the alternative mode can create an image taken with the use of additional equipment (e.g. an illumination source) or an image taken using higher resolution settings of the camera. Additionally, in some embodiments, the subsequent image can be captured using an alternative camera, and the alternative camera may be a comparably costly camera compared to the camera used to capture the first image or images from previous iterations (e.g. a high-definition camera) or a camera that includes additional equipment (e.g. includes a flash bulb). In alternate embodiments, the same camera may be used to capture the first image, the images from previous iterations of steps 330-350, and/or the subsequent image. In further embodiments, the alternative mode can represent capturing an image with a narrow and/or zoomed-in field-of-view compared to the first mode and/or compared to alternative modes from previous iterations of steps 330-350. In other embodiments, the alternative camera can be positioned as to have a narrow field-of-view compared to the camera used to capture the first image and/or compared to alternative cameras from previous iterations of steps 330-350.

In embodiments, the alternative mode can be preset. For example, the alternative mode can involve using a flash bulb, the alternative mode can involve using a set resolution that is higher than the resolution for the first mode and/or alternative modes from previous iterations of steps 330-350, or the alternative mode can involve zooming into a predetermined section of the wide field-of-view from the first mode and/or modes from previous iterations of steps 330-350. In other embodiments, the position of the alternative camera can be set so that the alternative camera has a different perspective than the camera used to capture the first image or images from previous iterations of steps 330-350. For example, the alternative camera can be set closer to a particular scene.

In further embodiments, the alternative mode can be set based on the results of processing the first image or images from previous iterations of steps 330-350. For example, if an object was detected in the first image but a confidence score for a recognition task performed on the object was low, the computing device can transmit a command to the alternative camera to pan, tilt, and/or zoom to capture as the subsequent image a specific area within the wide field-of-view captured in the first image.

In 340, the computing device can process the subsequent image. For example, the computing device can perform computer vision tasks that include, but are not limited to object detection, object localization, object recognition, and object identification.

Additionally, the computing device can compute a confidence score of a result of processing the first image by leveraging machine learning techniques. For example, the computing device can leverage machine learning techniques that include, but are not limited to SVM, AdaBoost, artificial neural networks, etc.

In 350, the computing device can compare the confidence score from 340 to the threshold score. The threshold score in 340 can be the same threshold score as in 320 or can be a different threshold score. If the confidence score is greater than or, in some embodiments, equal to the threshold score in 350, the computing device can use the result of processing the first image for an intended task (e.g. ALRP).

However, if in 350 the confidence score is less than or, in some embodiments, equal to the threshold score, the computing device can return to 330 and capture a new subsequent image using a new alternative mode. Accordingly, steps 330-350 can be repeatedly performed until either the threshold score is met or the alternative modes are exhausted. In embodiments, if the alternative modes are exhausted, the computing device can discard the images and processing results, can use the image and processing results that resulted in the highest confidence score, and/or use the image and processing results from the last iteration of steps 330-350.

While the steps depicted in FIG. 3 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

Figure 4:
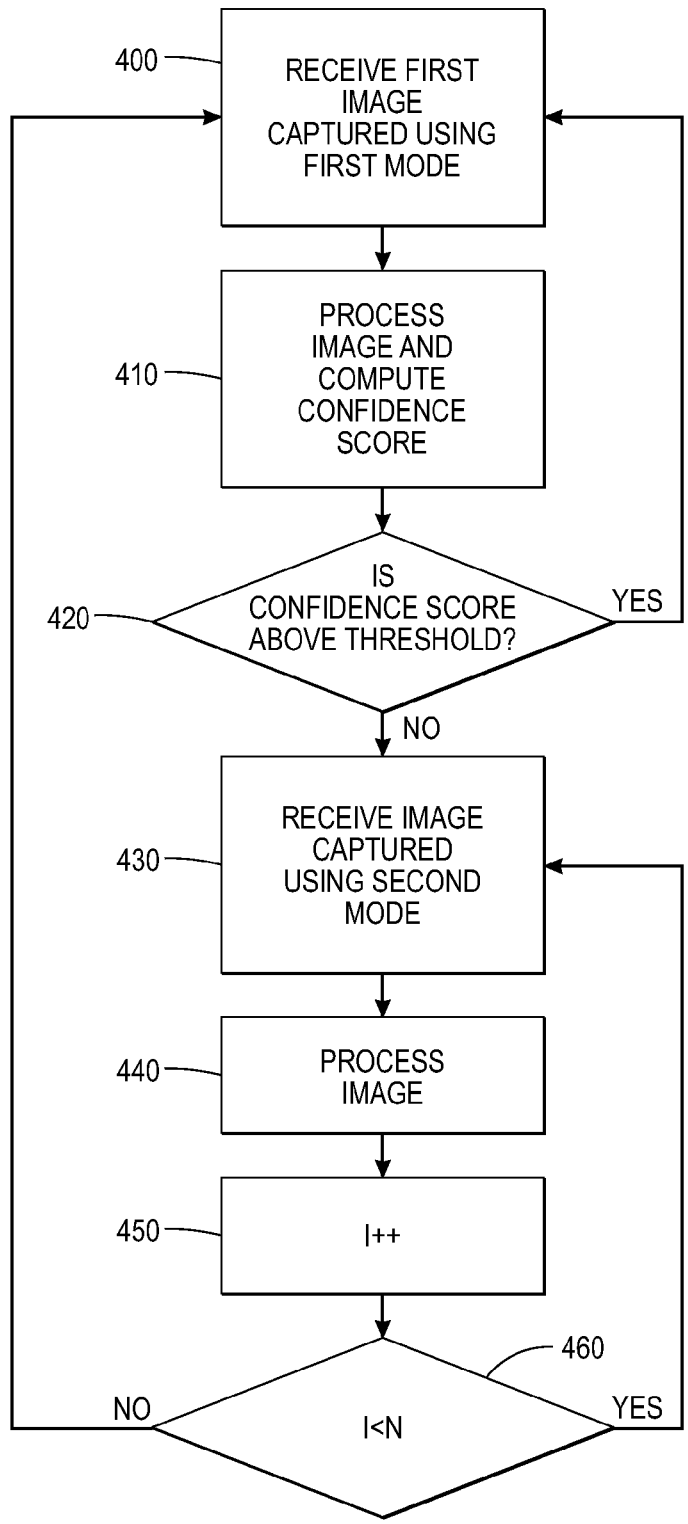
FIG. 4 is a flow diagram illustrating an exemplary method for triggering image re-capture based on confidence scores, consistent with certain disclosed embodiments.

FIG. 4 is a flow diagram illustrating an exemplary method for triggering image re-capture based on confidence scores, consistent with certain disclosed embodiments. The process can begin at 400 when a computing device receives a first image from a camera, and the first image was captured using a first mode.

In embodiments, the first mode can represent a simple mode of capturing an image. For example, use of the first mode can create an image taken without the use of additional equipment (e.g. an illumination source) or an image taken using lower resolution settings of the camera. In additional embodiments, the first mode can represent capturing an image with a wide field-of-view.

In 410, the computing device can process the first image. For example, the computing device can perform computer visions tasks that include, but are not limited to object detection, object localization, object recognition, and object identification.

Additionally, the computing device can compute a confidence score of a result of processing the first image by leveraging machine learning techniques. For example, the computing device can leverage machine learning techniques that include, but are not limited to SVM, AdaBoost, artificial neural networks, etc.

In 420, the computing device can compare the confidence score from 410 to a threshold score. If the confidence score is greater than or, in some embodiments, equal to the threshold score, the computing device can use the result of processing the first image for an intended task (e.g. ALPR).

However, if in 420 the confidence score is less than or, in some embodiments, equal to the threshold score, the computing device can continue to 430. In 430, the computing device can trigger an image re-capture and receive a subsequent image captured using a second mode.

In embodiments, the second mode can represent an advanced mode of capturing an image compared to the first mode. For example, use of the second mode can create an image taken with the use of additional equipment (e.g. an illumination source) or an image taken using higher resolution settings of the camera. Additionally, in some embodiments, the second mode can be associated with using an alternative camera, and the alternative camera may be a comparably costly camera compared to the first camera (e.g. a high-definition camera) or a camera that includes additional equipment (e.g. includes a flash bulb). In alternative embodiments, the same camera may be used to capture each image. In further embodiments, the second mode can represent capturing an image with a narrow and/or zoomed-in field-of-view compared to the first mode. In other embodiments, the alternative camera can be positioned as to have a narrow field-of-view compared to the first camera.

In embodiments, the second mode can be preset. For example, the second mode can involve using a flash bulb, the second mode can involve using a set resolution that is higher than the resolution for the first mode, or the second mode can involve zooming into a predetermined section of the wide field-of-view from the first mode. In other embodiments, the position of the second camera can be set so that the second camera has a different perspective than the camera used to capture the first image. For example, the second camera can be set closer to a particular scene.

If further embodiments, the second mode can be set based on the results of processing the first image. For example, if an object was detected in the first image but a confidence score for a recognition task performed on the object was low, the computing device can transmit a command to the second camera to pan, tilt, and/or zoom to capture as the subsequent image a specific area within the wide field-of-view captured by the camera used to capture the first image.

In 440, the computing device can process the subsequent image. For example, the computing device can perform computer vision tasks that include, but are not limited to object detection, object localization, object recognition, and object identification. Then the computing device can use the result of processing the subsequent image for the intended task (e.g. ALPR).

Additionally, the computing device can continue to receive images captured using the second mode a set number of times. For example, in 450, after using the result of processing the subsequent image, the computing device can increase an iterative value. Then, in 460, if the iterative value is less than the set number of times, the computing device can go to 430 to again receive a subsequent image captured using the second mode and perform the intended task. However, if in 460 the iterative value is greater than or equal to the set number times, the computing device can start the process over at 400 and receive an image captured using the first mode.

While the steps depicted in FIG. 4 have been described as performed in a particular order, the order described is merely exemplary, and various different sequences of steps can be performed, consistent with certain disclosed embodiments. Additional variations of steps can be utilized, consistent with certain disclosed embodiments. Further, the steps described are not intended to be exhaustive or absolute, and various steps can be inserted or removed.

For example, in some embodiments, an iterative value may not be used, and, alternatively, a confidence score of each result in 440 can be computed. If the confidence score of a result exceeds a threshold score, the computing device can return to 400. In other embodiments, the iterative value may only be increased in 450 each time a confidence score of a result in 440 is equal to and/or exceeds a threshold score.

Figure 5A:
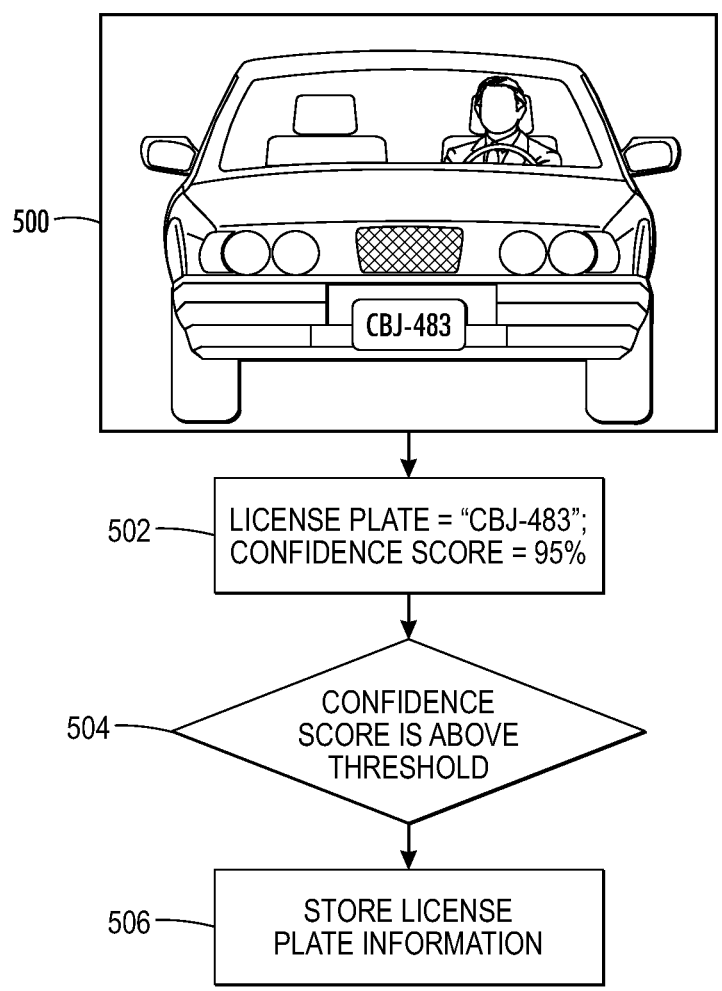
FIG. 5A is a diagram depicting an exemplary computer vision process where image re-capture is not triggered, consistent with certain disclosed embodiments.

FIG. 5A is a diagram depicting an exemplary computer vision process where image re-capture is not triggered, consistent with certain disclosed embodiments. In this example, a computing system can be configured to perform ALPR. The process can begin when a computing device receives image 500 from a camera, and image 500 is captured without using flash illumination (i.e. a first mode). As shown in image 500, the license plate is clearly visible even without use of the flash illumination, and image 500 can represent an image captured during a high ambient illumination period.

In 502, the computing device can process image 500. In this example, the computing device can perform ALPR to determine that the license plate in image 500 includes the text "CBJ-483." Additionally, the computing device can compute a confidence score of the ALPR result by leveraging machine learning techniques, such as SVM, AdaBoost, artificial neural networks, etc. In this example, the confidence score of the image 500 ALPR result is a high confidence score of 95% because image 500 represents an image captured during a high ambient illumination period.

In 504, the computing device can compare the confidence score from 502 to a threshold score. In this example, the threshold score can be 75%. The computing device can determine that the confidence score of 95% from 502 is higher than the threshold score of 75%. Accordingly, the computing device does not trigger an image re-capture and proceeds with the ALPR result from 502. In this example, in 506, the computing device stores the ALPR result from 502.

Figure 5B:
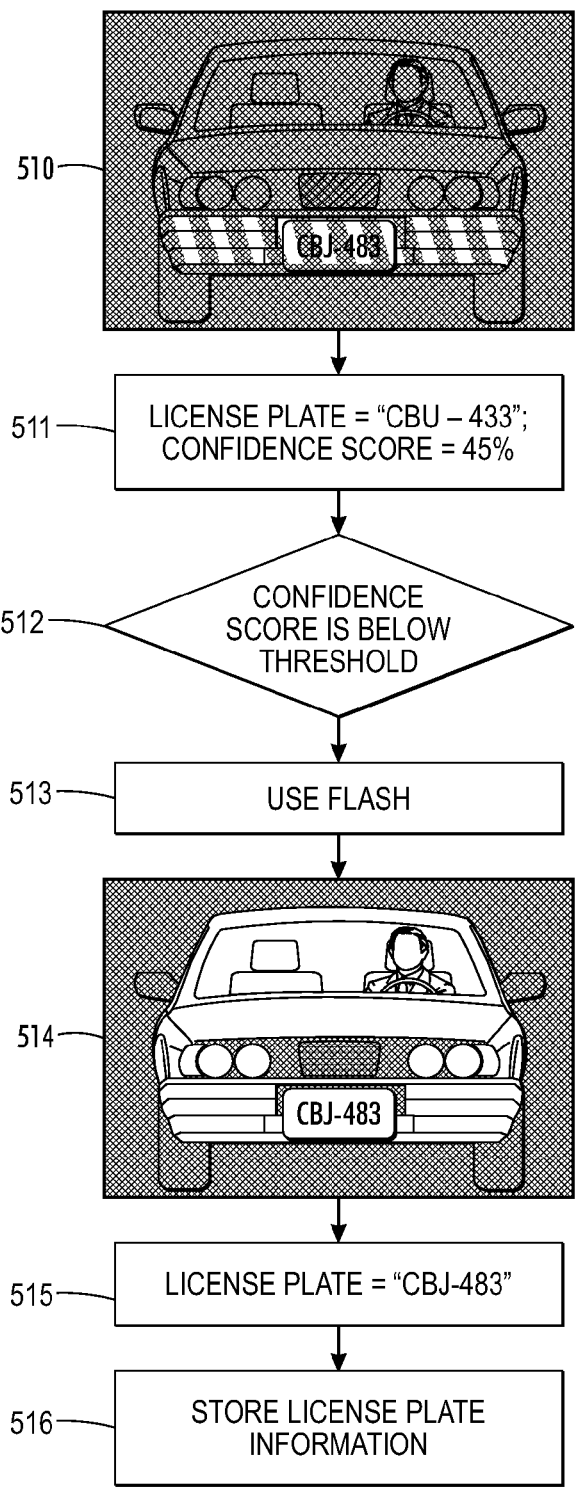
FIG. 5B is a diagram depicting an exemplary computer vision process where image re-capture is triggered, consistent with certain disclosed embodiments.

FIG. 5B is a diagram depicting an exemplary computer vision process where image re-capture is triggered, consistent with certain disclosed embodiments. In this example, a computing system can be configured to perform ALPR. The process can begin when a computing device receives image 510 from a camera, where image 510 is captured without using flash illumination (i.e. a first mode). As shown in image 510, the license plate is not completely visible, and image 510 can represent an image captured during a low ambient illumination period.

In 511, the computing device can process image 510. In this example, the computer device can perform ALPR to estimate that the license plate in image 510 includes the text "CBU-433." Additionally, the computing device can compute a confidence score of the ALPR result by leveraging machine learning techniques, such as SVM, AdaBoost, artificial neural networks, etc. In this example, the confidence score of the image 510 ALPR result is a low confidence score of 45% because image 510 represents an image captured during a low visibility period.

In 512, the computing device can compare the confidence score from 511 to a threshold score. In this example, the threshold score can be 75%. Accordingly, the computing device can determine that the confidence score of 45% from 511 is lower than the threshold score of 75%. Accordingly, the computing device can trigger an image re-capture in 513 using flash illumination. The computing device can receive image 514 from the camera, where image 514 is captured using the flash bulb (i.e. a second mode or an alternative mode). As shown in image 514, the license plate is more clearly visible when the flash illumination was used than in image 510 when the flash illumination was not used. Image 514 can represent an image captured during the same low ambient illumination period as image 510, which includes the same vehicle and the same license plate as image 514.

In 515, the computing device can process image 514. In this example, the computing device can again perform ALPR to determine that the license plate in image 514 includes the text "CBJ-483." The computing device can then proceed with this ALPR result. In this example, in 516, the computing device stores the ALPR result from 515.

Figure 6:
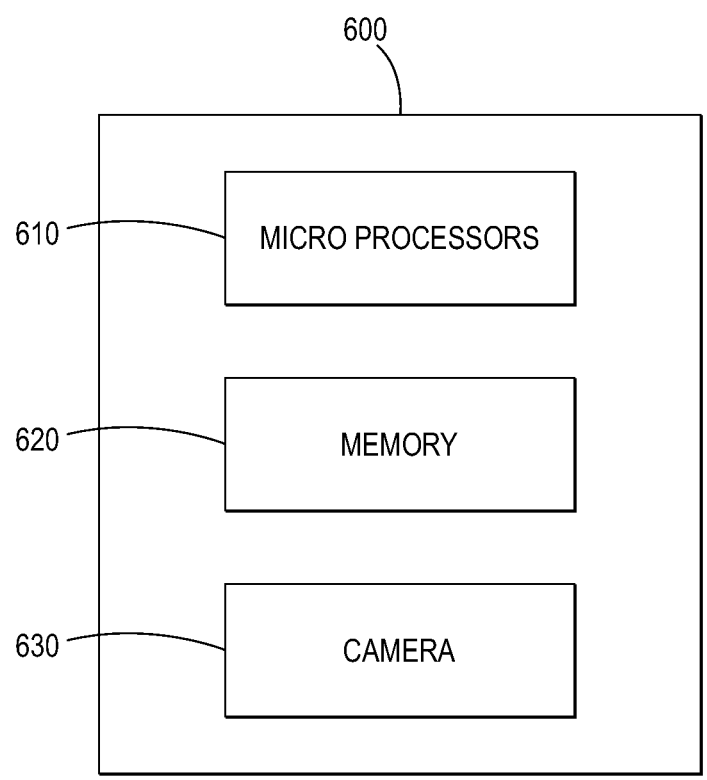
FIG. 6 is a diagram depicting an exemplary computing device that may utilize computer vision technologies, consistent with certain disclosed embodiments.

FIG. 6 is a diagram depicting an exemplary computing device that may utilize computer vision technologies, consistent with certain disclosed embodiments. Computing device 600 may represent any type of one or more computing devices able to receive input from camera 630. In embodiments, camera 630 can represent a single camera or multiple cameras. In further embodiments, camera 630 can represent one or more still image cameras, one or more video cameras, or a combination thereof. Additionally, in some embodiments, one or more of camera 630 can be integrated with computing device 600, while, in further embodiments, one or more of camera 630 can be a separate device capable of sending to and/or receiving information from computing device 600.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; one or more transmitters for communicating over network protocols, such as Ethernet, code divisional multiple access (CDMA), time division multiple access (TDMA), etc. One or more microprocessors 610 and one or more memory devices or computer-readable media 620 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments.

What is claimed is:

1. A method of triggering image re-capture in image processing, the method comprising:
receiving a first image from a first camera, wherein the first image is captured using a first mode;
performing a computer vision task on the first image to determine a first result, wherein the computer vision task results in a decision making metric, and the first result is determined based on the decision making metric being within one or more decision boundaries;

generating a confidence score of the first result using a machine learning technique, wherein the confidence score is generated based on a distance between the decision making metric and a decision boundary of the one or more decision boundaries;

triggering, in response to the confidence score of the first result, a second camera to capture a second image, wherein the second image is captured using a second mode; and performing the computer vision task on the second image to determine a second result.

2. The method of claim 1, wherein the first mode is inexpensive relative to the second mode.

3. The method of claim 1, wherein the first camera is the second camera.

4. The method of claim 1, further comprising selecting the second mode based on the first result, the confidence score of the first result, or a combination thereof.

5. The method of claim 1, wherein a predetermined number of subsequent images are received from the second camera using the second mode in response to the confidence score of the first result.

6. The method of claim 1, wherein the first image is a first plurality of images and the second image is a second plurality of images.

7. The method of claim 1, further comprising:
generating a confidence score of the second result using a machine learning technique;
triggering, in response to the confidence score of the second result, a capture of a third image, wherein the third image is captured using a third mode; and
performing the computer vision task on the third image to determine a third result.

8. The method of claim 1, wherein the computer vision task is object detection, object localization, object recognition, object identification, or a combination thereof.

9. The method of claim 1, wherein the second mode utilizes an illuminator and the first mode does not utilize the illuminator.

10. The method of claim 1, wherein images captured using the second mode are higher resolution than images captured using the first mode.

11. The method of claim 1, wherein images captured using the second mode capture a narrower field-of-view relative to images captured using the first mode.

12. The method of claim 1, wherein a perspective of the second camera is changed in response to the first result.

13. A system for triggering image re-capture in image processing comprising:
a processing system comprising one or more processors; and
a memory system comprising one or more computer-readable media, wherein the one or more computer-readable media contain instructions that, when executed by the processing system, cause the processing system to perform operations comprising:
receiving a first image from a first camera, wherein the first image is captured using a first mode;
performing a computer vision task on the first image to determine a first result, wherein the computer vision task results in a decision making metric, and the first result is determined based on the decision making metric being within one or more decision boundaries;
generating a confidence score of the first result using a machine learning technique, wherein the confidence score is generated based on a distance between the decision making metric and a decision boundary of the one or more decision boundaries;
triggering, in response to the confidence score of the first result, a second camera to capture a second image, wherein the second image is captured using a second mode; and
performing the computer vision task on the second image to produce a second result.

14. The system of claim 13, wherein the first mode is less expensive relative to the second mode.

15. The system of claim 13, wherein the first camera is the second camera.

16. The system of claim 13, wherein the processing system further performs operations comprising selecting the second mode based on the first result, the confidence score of the first result, or a combination thereof.

17. The system of claim 13, wherein a predetermined number of subsequent images are received from the second camera using the second mode in response to the confidence score of the first result.

18. The system of claim 13, wherein the first image is a first plurality of images and the second image is a second plurality of images.

19. The system of claim 13, wherein the processing system further performs operations comprising:
generating a confidence score of the second result using a machine learning technique;
triggering, in response to the confidence score of the second result, a capture of a third image, wherein the third image is captured using a third mode; and
performing the computer vision task on the third image to determine a third result.

20. The system of claim 13, wherein images captured using the second mode capture a narrower field-of-view relative to images captured using the first mode.

* * * * *